April 20, 1965 N. J. FINSTERWALDER 3,178,936
FLEXURAL TESTING OF MATERIALS
Filed Dec. 18, 1962 6 Sheets-Sheet 1

FIG.I.

Norman J. Finsterwalder,
Inventor,
Koenig, Pope, Senniger and Powers,
Attorneys.

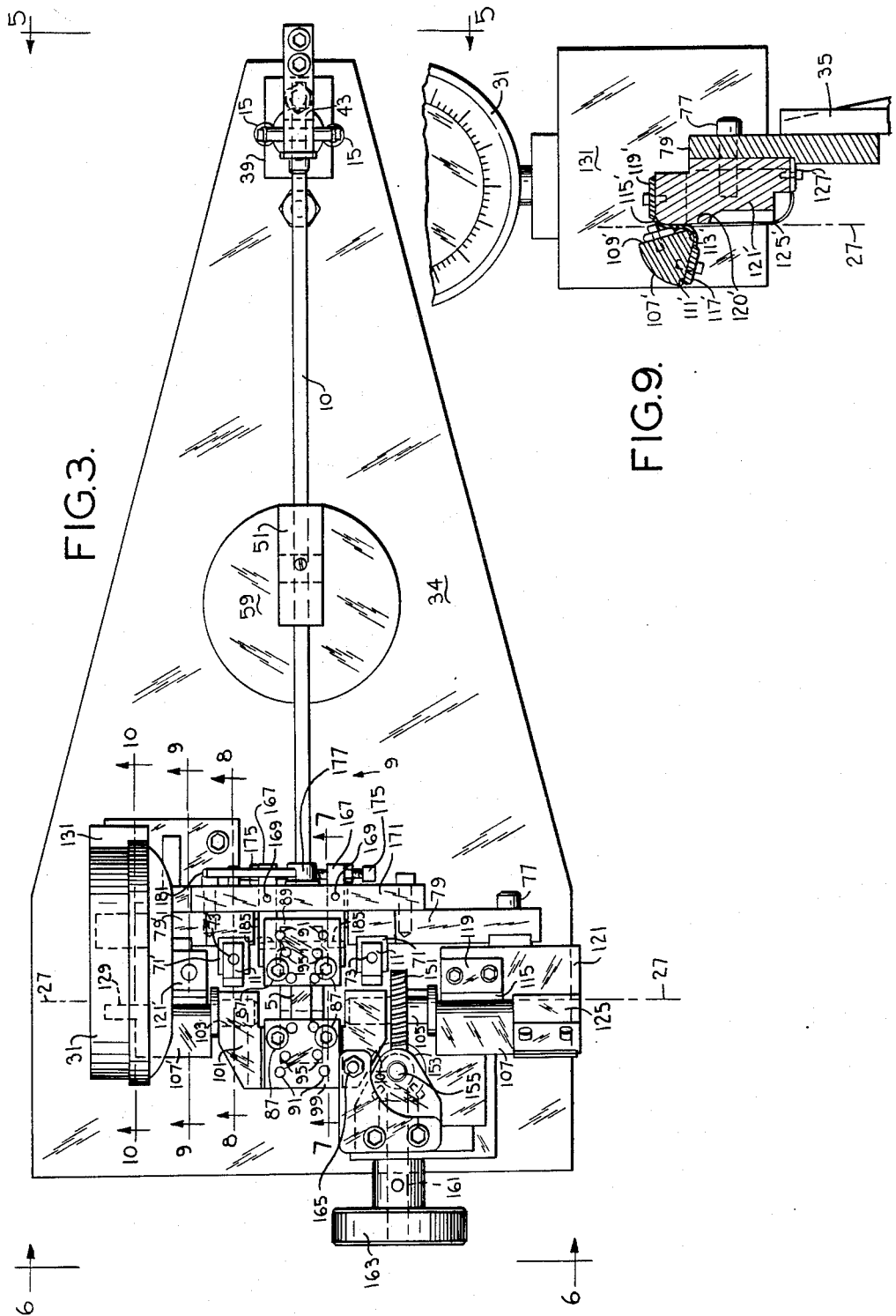

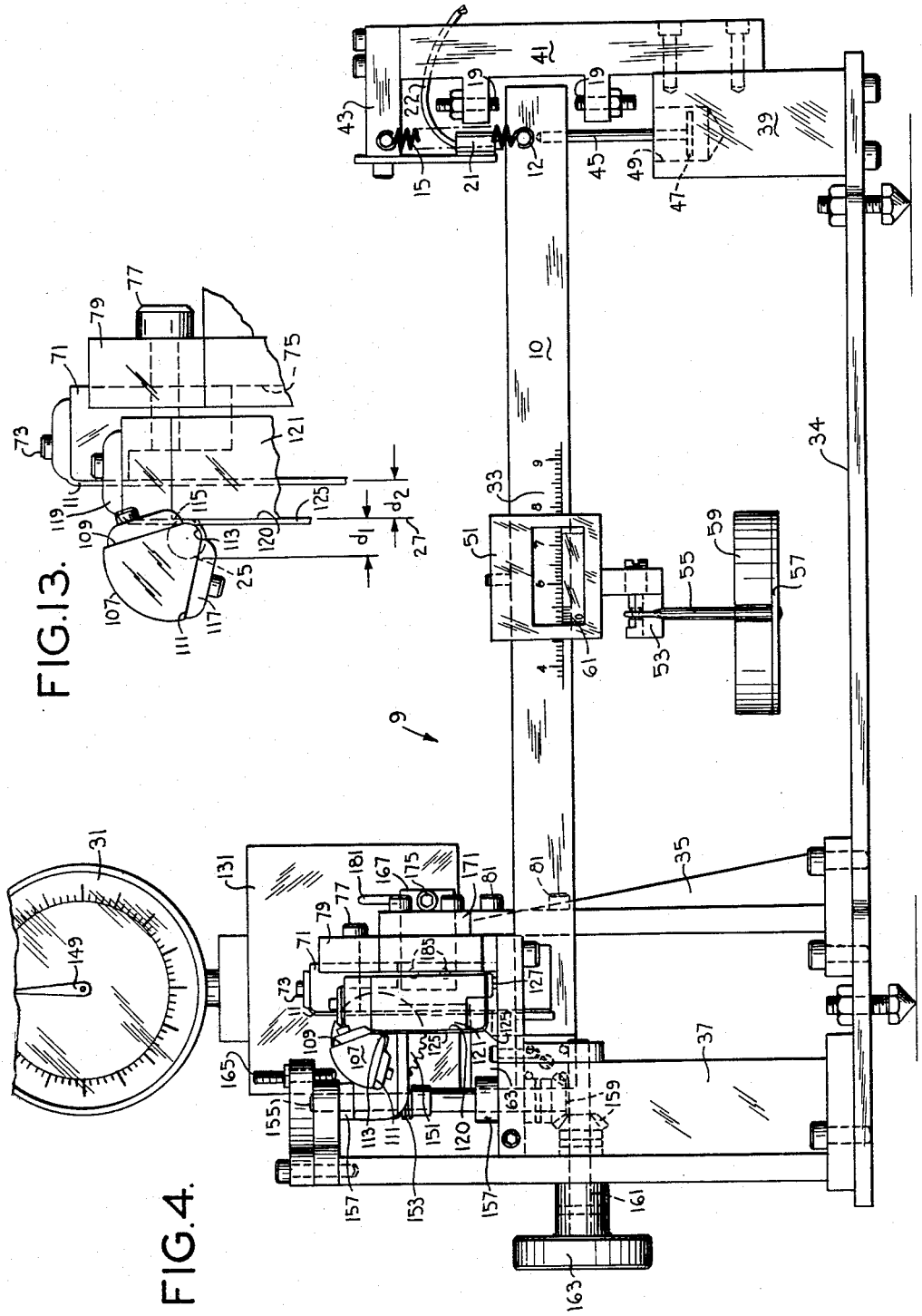

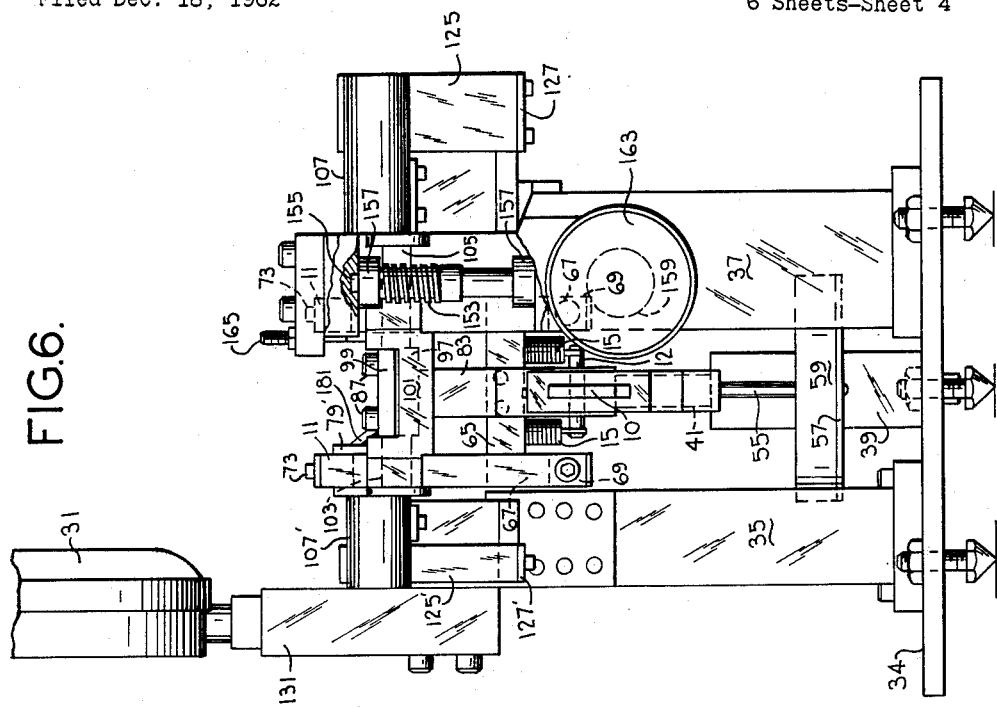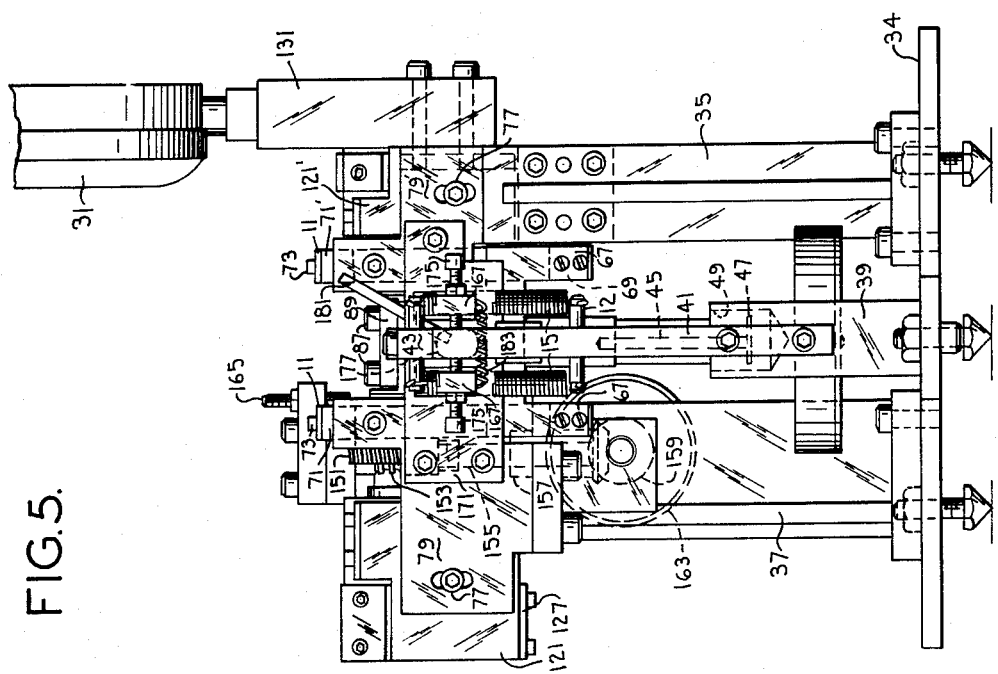

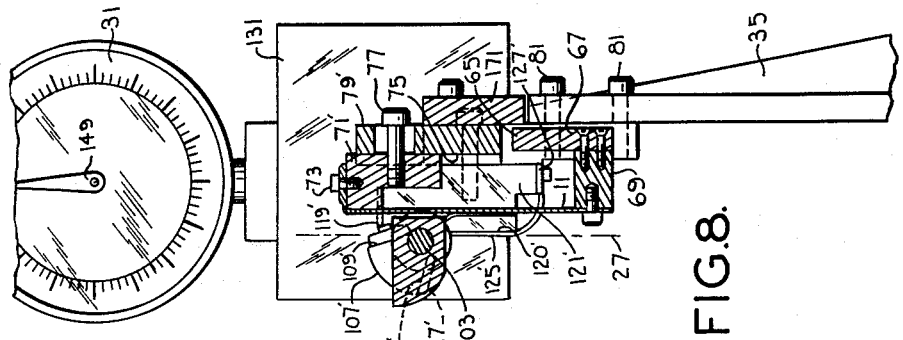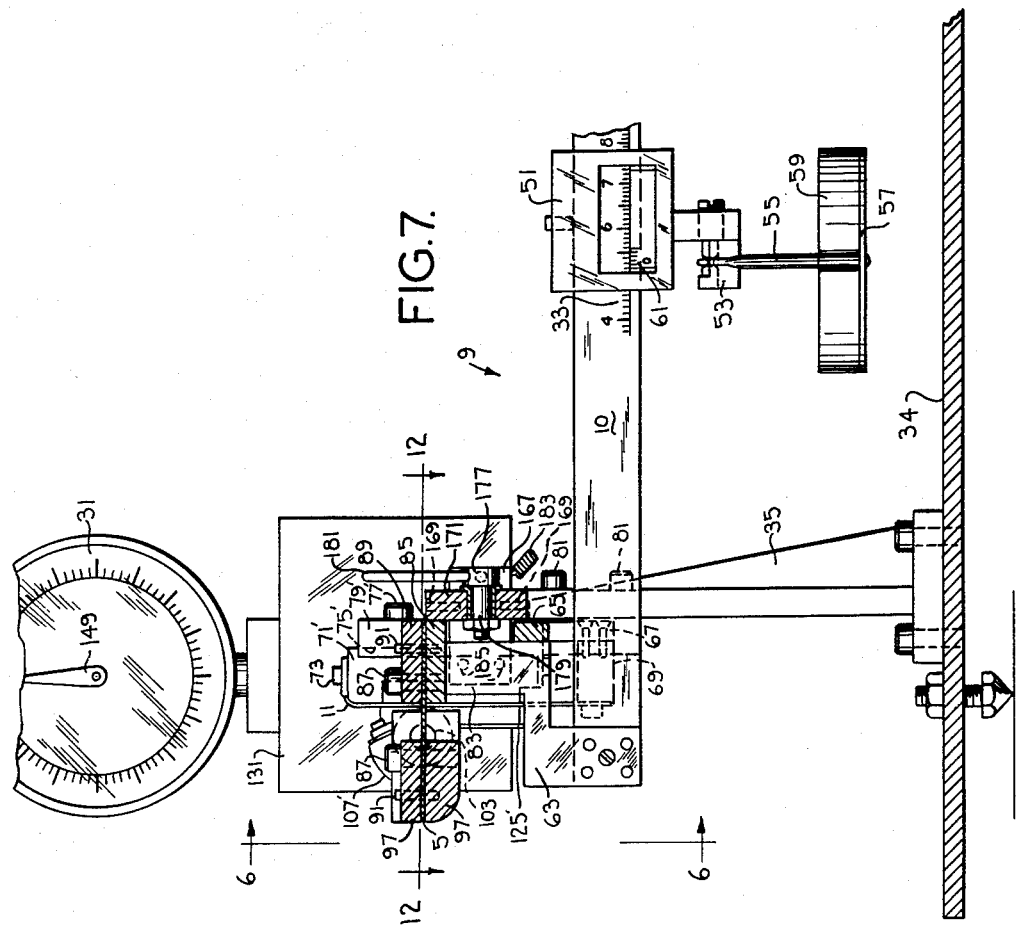

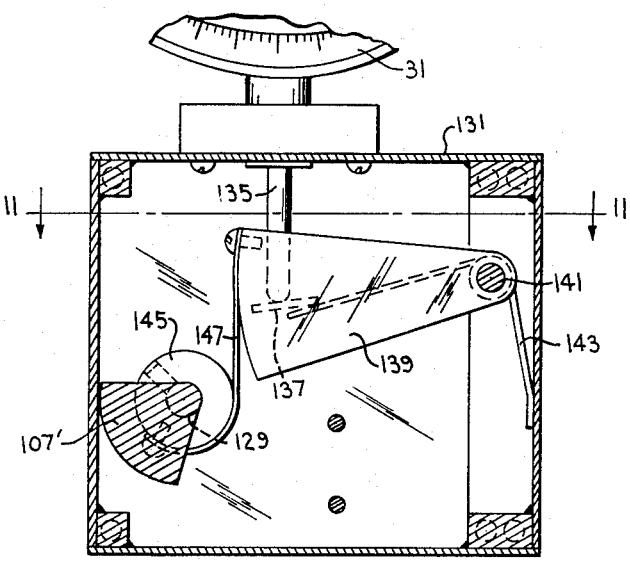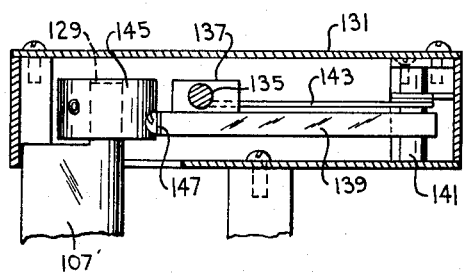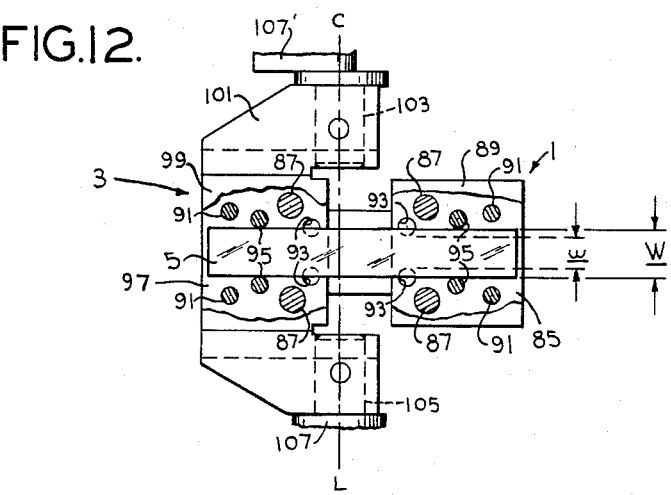

United States Patent Office 3,178,936
Patented Apr. 20, 1965

3,178,936
FLEXURAL TESTING OF MATERIALS
Norman J. Finsterwalder, Rochester, N.Y., assignor to Texas Instruments Incorporated, Dallas, Tex., a corporation of Delaware
Filed Dec. 18, 1962, Ser. No. 245,615
6 Claims. (Cl. 73—100)

This invention relates to flexural testing of materials, and with regard to certain more specific features, to the testing of metals and the like by bending suitable lengths thereof.

Among the several objects of the invention may be noted the provision of an improved method and apparatus for testing by flexure appropriate specimens of single and composite materials and the like of simple shape without incurring shearing stresses; the provision of a method and apparatus of the class described which will provide a more direct measure than heretofore obtained of the behavior of the materials under conditions of bending under load, as, for example, when used as springs; the provision of apparatus of the class described which is sufficiently sensitive to detect inelastic effects of very small proportions, and which is adapted for full-cycle loading, permitting the detection of hysteresis, zero set and elastic after-effect, as well as yield strength and elastic limit; the provision of a method and apparatus employing a pair of convenient parameters of load and deflection which may be linearly related and readily converted to stress-strain relationships; and the provision of sensitive but rugged apparatus of the class described in which friction is largely eliminated. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, and the scope of which will be indicated in the following claims.

In the accompanying drawings, in which one of various possible embodiments of the invention is illustrated, FIGS. 1 and 2 are diagrammatic elevation and plan views illustrating certain geometrical features forming the basis of the invention;

FIG. 3 is a top plan view of apparatus embodying the invention;

FIG. 4 is a front elevation of FIG. 1;

FIG. 5 is a right-end elevation taken on line 5—5 of FIG. 3;

FIG. 6 is a left-end elevation taken on line 6—6 of FIGS. 3 and 7;

Figure 2:
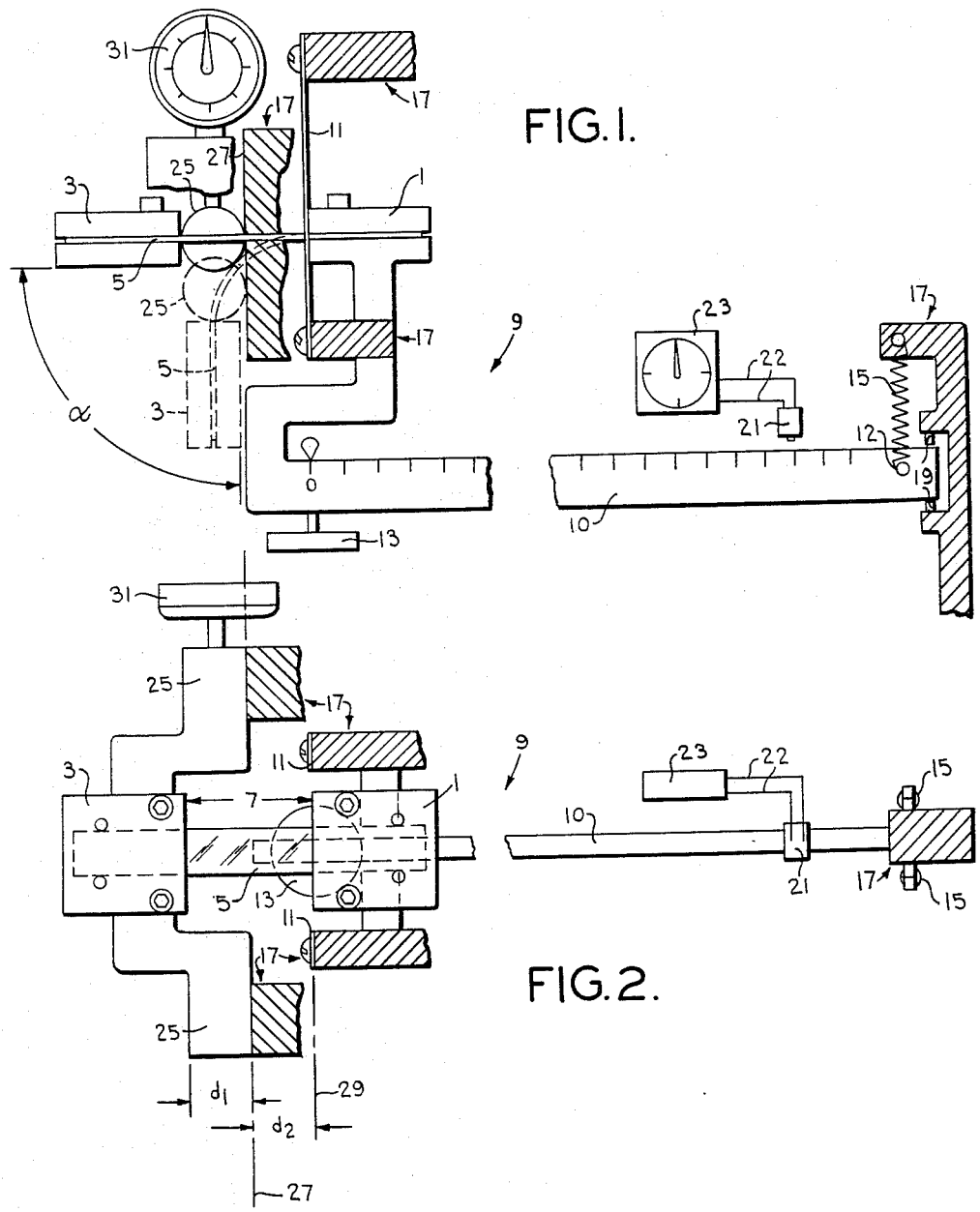

FIGS. 7, 8, 9 and 10 are cross sections taken on lines 7—7, 8—8, 9—9 and 10—10, respectively, of FIG. 3, FIG. 10 being enlarged;

FIG. 11 is a horizontal section taken on line 11—11 of FIG. 10;

FIG. 12 is an enlarged horizontal section taken on line 12—12 of FIG. 7; and

FIG. 13 is a substantially enlarged view of a portion of FIG. 4, illustrating certain geometrical relationships corresponding to those illustrated in FIG. 1.

Corresponding reference characters indicate corresponding parts throughout the several views of the drawings.

Heretofore, one test for determining the behavior of materials under conditions of loading in bending has been obtained by measuring tensile strength, wherein a specimen is subjected to axial loading, causing a substantially uniform degree of strain over its cross-sectional area and throughout the test length. The expected behavior in bending was arrived at through suitable formulae requiring measurement of tensile strength. Undesirable features of this method are illustrated by the case of a cross section of flat steel spring leaf with a decarburized surface layer. Assuming an overall thickness of 0.053" and a decarburized surface layer of 0.0005" in depth, it is found that the moment of inertia of the decarburized region accounts for 11.5% of the over-all moment of inertia of the section. This amount is attributable to only 4% of the cross-sectional area, situated on opposite surfaces. The elastic energy that a part can store under stress is directly proportional to the moment of inertia and, therefore, the decarburized region accounts likewise for 11.5% of the total energy capacity. Since the decarburized region is soft, with a relatively low elastic limit, and also occupies the region of maximum stress under bending, the material under such conditions will undergo permanent strain in the outer fibers, or "set" at a stress level far below the stress limit for the underlying material of normal hardness. Thus the decarburized surfaces will significantly affect the properties in bending. Tests in tension, where stress is uniformly distributed, show only an insignificant decrease in yield strength due to the decarburization, whereas actually strength in bending is significantly reduced. This example illustrates the desirability of evaluating material to be used in bending under test conditions which will involve flexure.

Heretofore, bending tests have been carried out by bending the specimen mounted as a cantilever with one end portion rigidly anchored and the other end supporting the load. The difficulty with such an arrangement is that a uniform level of stress is not maintained throughout the length of the cantilever. Bending moment is a maximum at the anchor point, and decreases as the point of application of force is approached and becoming zero where the force is applied. Moreover, the radius of curvature changes along its length from the anchor point to the point of force application. Hence there is no finite length of the material subject to the same level of bending effects throughout such a length. In addition, application of force in this former manner introduced shear stresses.

By means of the present invention, tests are made by bending under load, thereby closely simulating the actual loading conditions in use. But this is accomplished in such a manner that a substantially uniform level of stress exists throughout the test length (hereinafter called the gage length) of the test specimen. Thus it becomes possible to obtain a direct and linear relationship between the parameters consisting of stress and angle of bend, and the invention provides simple and accurate means for obtaining such parameters.

Briefly, as illustrated in FIGS. 1 and 2, the fundamentals of the invention consist of a first or weighing clamp 1 and a second or loading clamp 3 for a test specimen 5. The specimen may be in the form of a simple rectangular strip, the gage length being indicated at 7 and determined by the space between the inner margins of the clamps. The weighing clamp 1 is an integral part of a beam assembly or system 9 which is supported, at one end, by a flexible, substantially frictionless suspension 11, composed, for example, of two lengths of a thin metal strap material and at the other end by tension springs 15. The beam system includes a beam 10 which carries a movable and variable weight 13. In null position the weight 13 is located in the plane of the suspension 11. The suspension 11 is supported by frame parts 17. Another part 17 supports the upper end of the springs 15. The lower ends of the springs are attached at 12 to the outer end of the beam 10. Vertical movement of the beam system 9 is limited by opposite stops 19 on the frame 17. A null position of the beam 10 between stops 19 is indicated by a conventional electrical distance sensing detector 21 and associated indicator 23. Wiring 22 connects detector 21 and indicator 23. The sensing element 21 is spaced a short distance from the outer end of the beam 10 and hence there is no physical contact between them. Thus indicator 23 shows when the weighing clamp is in its null or horizontal position.

The loading clamp 3 is rotatable through a 90° angle from the initial solid (horizontal) to the dotted (vertical) position shown in FIG. 1. In the horizontal position the specimen 5 is straight. In all other angled positions it is bent. A suitable mechanical movement is provided such that the test section 7 when bent always forms a portion of a substantially circular arc, the radius of which decreases as the resulting bending of the section 7 proceeds. The maximum bending is illustrated by dotted lines in FIG. 1. Since the stress in specimen 5 is an inverse but proportional function of the radius of the curvature, various degrees of uniform stress may be obtained throughout the length of the test section 7 by varying the amount of bending.

There are various ways in which the required angling motion of loading clamp 3 may be obtained but an important geometric feature is that an imaginary or virtual circle (or cylinder) such as illustrated at 25 will in a geometric sense (without sliding) roll down an imaginary plane such as shown at 27. Upper and lower positions of the circle 25 are shown in FIG. 1 by solid and dotted lines respectively. The diameter of the circle and the position of the plane 27 are selected for the gage length 7 employed and are such that said test section 7 will always form the desired circular-arc bent form for specimen 5, the radius of curvature of which decreases as its bending proceeds from a straight condition (infinite radius of curvature) to a minimum radius of curvature, the latter being that corresponding to the maximum angle through which the loading clamp 3 is turned (90° in the present example, as shown in FIG. 1).

In the present embodiment, the diameter $d_1$ of the circular form 25 is equal to the distance $d_2$ from plane 27 to the central plane 29 of suspension 11. Since it is desirable to obtain a measure of the angle $\alpha$ of bending of the strip 5, the turning motion of the circular form 25 is transmitted to an angle indicator 31, as will be described more particularly below.

As the loading clamp 3 rotates (and also moves down and to the right) the bending force thereby induced in the test specimen 5 will be transmitted to the weighing clamp 1, tending to cause it to rotate. This tendency is counteracted by adjusting the weight 13 along the beam 10 so as to maintain the beam system 9 in its original horizontal null position. Indicator 23 shows when the weighing system levels clamp 1. The beam system 9 is provided with a scale 33 having suitable intervals, such as inches and fractions thereof. The weight 13 can be changed, as will appear. For example, the pounds-inches of moment required to keep the clamp 1 level will be indicated. Thus two related parameters constituted by the variable angle $\alpha$ in degrees and a variable bending moment M in pounds-inches may readily be obtained and read out of the device. Since there is a linear relationship between maximum fiber stress and bend angle, the fiber stress, modulus, energy, and strain may be computed using the following relationships:

$$S = \frac{Et\Delta\alpha}{2KL} \quad (1)$$

$$S = \frac{6M}{bt^2} \quad (2)$$

$$E = \frac{12LMK}{\Delta\alpha bt^3} \quad (3)$$

$$U = \frac{M\Delta\alpha}{2K} \quad (4)$$

$$s = \frac{\Delta\alpha t}{2KL} \quad (5)$$

where

S = maximum fiber stress, p.s.i.;
E = modulus of elasticity, p.s.i.;
L = length of test section, inches;
t = thickness of test section, inches;
b = width of test section, inches;
$\Delta\alpha$ = change in bend angle, degrees;
K = constant 57.296;
M = bending moment, pounds-inches;
s = strain in outer fiber, inches per inch;
U = energy, inch-pounds.

It will be understood that while the material to be tested in bending has been shown as a flat strip to which the above equations apply, it could be in the form of a length of wire or the like by providing suitable holding grooves or other recesses in the clamps 1 and 3 and by using other appropriate formulae.

FIGS. 3–12 show in greater detail the mechanism embodying the fundamentals illustrated in FIGS. 1 and 2.

Referring to FIGS. 3–6, the framework above mentioned includes a base 34 carrying standards 35, 37 and 39. Standard 39 has bolted to it a bracket 41 carrying the limit stops 19 above mentioned for the beam 10. The bracket 41 includes an overhanging piece 43 forming a support for the springs 15 and also for carrying the sensing element 21. The detector requires no mounting on the frame, although it may be so mounted, if desired.

Attached to the outer end of beam 10 is a rod 45 carrying a piston 47 loosely operative in a liquid-filled cylinder 49 carried by the standard 39, thus providing a dash-pot for damping oscillations of the beam 10. On the beam 10 is a runner 51 supporting a member 53 which pivotally supports the stem 55 of a disc 57 for supporting one or more weights, one of which is shown at 59. The runner includes a vernier scale 61 for the usual use of fine reading in conjunction with the scale 33.

Beam assembly 9 includes a knee member 63 (FIGS. 7 and 8) attached to the left end of its beam 10. This is angled back along the beam 10 to form support for a C-shaped crossbar 65 having two transversely located, downwardly extending ends 67. Each end 67 supports an anchor block 69 to which the lower end of a flexible metal or equivalent tape 11 is anchored. The tapes 11 extend upward, each being connected at its upper end by screws 73 to adjustable anchor pieces 71 and 71' respectively, corresponding to parts 17 of FIGS. 1 and 2. Each anchor piece slides in a groove 75 of a supporting block 79, 79', as the case may be. Each block 79 is held in adjusted position by a bolt 77. Each block 79 is bolted to a standard 35 by bolts shown at 81.

The knee part 63 (FIG. 7) includes an upward extension 83 which supports a flat bottom jaw 85 of the abovementioned weighing clamp 1. Releasably attached by bolts 87 to the bottom jaw 85 is a flat top jaw 89. Dowel pins 91 are employed for accurately aligning the position of the top jaw 89 on the bottom jaw 85. A fragment of jaw 89 is shown in FIG. 12. Two pairs of guide pins in the jaws are employed for locating strips or specimens of different widths to be tested. Dash lines w on FIG. 12 indicate alignment for a comparatively narrow specimen, and dash lines W for the wider specimen illustrated. The specimen 5 is shown in position in FIG. 12 with the guide pins 95 therefor in clamp 1. Holes 93 are used for additional guide pins (not shown) for the narrower specimens.

FIG. 12 also shows the other loading clamp 3, which has a lower flat jaw 97 to which an upper jaw 99 is attached by an additional set of the bolts 87. Additional pairs of dowel pins 91, guide pins 95, and holes 93 are provided for an additional set of guide pins (not shown). The lower jaw 97 of the clamp 3 constitutes part of a U-shaped rotatable member 101 to which are pinned coaxial gudgeons 103 and 105 which are rotatable on a center line CL. When the member 101 rotates, the loading clamp 3 also rotates with its clamped end of the specimen 5. This end of the specimen, relative to its other end, moves down and toward said other end, the latter being held in the clamp 1. Gudgeon 105 has a sector-shaped extension 107, having flat upper and lower converging sides 109 and 111 (FIGS. 4 and 13). Its apex is rounded and of cylindrical form, as shown at 113. A flexible metal tape 115 is wrapped around the cylindrical part 113 and attached to the lower side 111 by anchor means 117. The tape 115 extends vertically upward and is anchored at 119 on a block 121, which it engages flatly as shown at 120. The block 121 is supported through an intermediate block 79 on the standard 37. A second tape 125 is downwardly anchored at 127 to said block 121 and extends upward along the flat wall 120 of this block, being wrapped around part 113 and attached to the upper side 109 of the sector-shaped extension 107. (FIGS. 4 and 13).

A corresponding arrangement is provided in connection with the other gudgeon 103 which has a sector-shaped extension 107' corresponding in function to sector 107 and having a circular portion 113'. It has wrapped tapes 115' and 125', corresponding to tapes 115 and 125. These tapes are connected between a block 121' and the sector 107' in the same manner that the tapes 115 and 125 are connected between block 121 and sector 107. Block 121 has a vertical surface 120' corresponding to surface 120 and in its plane. Like numerals designate like parts in these respects, except for the prime designations (compare FIGS. 4 and 13 with FIGS. 7 and 8). Thus the U-shaped member 101 is supported for rotation and translation by the vertical rolling action of the circular portions 113 and 113' with their wrapped tapes 115, 125, 115', 125' respectively, on the surfaces 120, 120'. Tapes 115, 125 are on one side of the beam 10 and the tapes 115', 125' are on the other side.

As the U-shaped member 101 rotates anticlockwise, one set of tapes such as 115, 115' will unwind from the cylindrical portions 113, 113' whereas the other set 125, 125' will be wound thereon. This provides a flexible suspension for the loading clamp. It also provides not only rotary movement for the loading clamp 3 but also descending and transverse movements of the end of specimen 5 held in the loading clamp relative to the end held in the weighing clamp. The result is the accurate rate formation of variable circular curvatures in the gage length 7 of the specimen 5. Each different radius of curvature attained is constant throughout the length 7 of the specimen 5, so that stress engendered therein is constant in value throughout its length. It will be observed that the effective coaxial rolling circles or cylinders 25, shown in FIG. 13 as well as in FIG. 1, are of diameters $d_1$ equal to the distances $d_2$ from the outsides of tapes 125, 125' to the central planes of the respective suspension tapes 11. Thus the rolling circles 25 are of radii equal to the radii of the circular portions 113, 113' plus the thicknesses of the tapes wrapped around them.

Angular motion of the U-shaped member 101, and consequently also of the load clamp 3, is obtained by providing a pintle 129 on the center lines of the gudgeons 103 and 105 (FIG. 3). This pintle is shown more particularly in FIGS. 10 and 11. It is located in a box 131, suitably supported on the standard 35. This box supports a conventional dial gage 31, from which extends a motion-receiving finger 135, operated by a plate 137 on a sector member 139, pivoted at 141. For high accuracy the gage 31 is multi-rotational. The assembly 137, 139 is biased by spring 143, so as to engage plate 137 with the finger 135. The pintle 129 is provided with a sheave 145 and a flexible transmission belt 147, which connects the periphery of the sheave 145 with the periphery of the sector 139. The diameter of the sheave 145 is so chosen and the gage 31 is so calibrated that during the rotary and translatory movements of the U-shaped member 101 the movement of the pointer 149 on the gage 31 will display only rotation in degrees (for example) of the member 101 and consequently will register rotation in degrees of the load clamp 3.

In order to rotate the U-shaped member 101, a worm wheel 151 is keyed to the gudgeon 105 and meshes with a worm 153 on a vertical shaft 155 carried in bearings 157. Shaft 155 is driven through a bevel gear train 159 from a shaft 161 on which is a hand control wheel 163. Thus by turning the wheel 163 the worm wheel 151 may be driven from the worm 153. This will be true in any of the various elevations assumed by the center line of the worm wheel 151, because the axial position of a worm relative to a worm wheel which it drives is not critical. At numeral 165 is shown an adjustable limiting stop for clockwise rotation of the U-shaped member 101 (FIGS. 3 and 4). The limiting position is preferably, although not necessarily, such that in the starting position of rotation the clamps 1 and 3 are essentially coplanar and the specimen 5 is in its initial or straight position.

In view of the flexible suspension system used for the weighing assembly 9, friction is minimized, since a number of usual cylindrical and knife-edge bearings are dispensed with. As a consequence, however, the beam assembly parts, unless restrained, might be pushed from side to side on the thin tapes 11 during application of the specimen 5 to the clamps 1 and 3. A mechanism is employed to avoid this, being best shown in FIGS. 3, 4, 5 and 7. This consists of a pair of rocker arms 167, pivoted at 169, to a bar 171, bolted on blocks 79, 79'. Blocks 79, 79' are attached to the standards 35 and 37 respectively.

The outer ends of the rocker arms 167 carry adjustable cam followers 175 between which a cam 177 is located. Contact between the followers 175 and cam 177 is maintained by a transverse tension spring 183 connected between the arms 167. The cam is rotatably mounted in the bar 171 as shown at 179 in FIG. 7. It carries a handle 181, by means of which it may be flipped to cause a spreading action between the followers 175 and consequently approach action between the other ends of bars 171. The other ends of the rocker arms carry pointed pins 185. When the cam 177 is turned to separate the outer ends of the arms 167, these pins are retracted from the opposite faces of the upward extension 83. When the lever 181 is thrown so that the cam 177 separates the outer ends of the arms 167, the points of the pins 185 are driven into suitable shallow conical sockets under the pins in the member 83. There are two pins 185 on each side of the member 83, so that the entire weighing system 9, of which part 83 is a component, will be rigidly locked to the framework. When this occurs, application of a specimen 5 to the clamps 1 and 3 may freely be performed without damage. After the specimen has been inserted in the clamps and locked in position, the lever 181 may be flipped to a position in which the spring 183 withdraws the pins 185 from their sockets, thus releasing weighing system 9 for free suspension on the tapes 11.

Assuming that a specimen has been properly clamped in the weighing and loading clamps 1 and 3, an appropriate weight or weights 59 have been placed on the disc 57 in the zero position of runner 51, and the locking mechanism for the weighing system released, the first step in a typical test procedure is to balance the system. This is accomplished by rotating the wheel 163 until the beam 10 arrives at the null position between steps 19, as indicated by a certain position of the pointer in detector 23. This method of adjusting the balance of the system eliminates the need for a high degree of straightness of the test specimen and in fact, permits testing of samples with a considerable degree of initial curvature. The accuracy of test results is not thereby affected since, per Equation 1, above set forth, stress is a direct and linear function of the change in angle $\Delta\alpha$. The gage 31 is set to indicate zero angle of deflection. Usually such gages have rotary dials for such purposes. The runner 51, carrying weight or weights 59, is moved to the right in appropriate increments producing a clockwise moment in the weighing system. For each increment the wheel 163 is turned so as to rotate the loading clamp 3 anticlockwise toward the dotted-line position shown in FIG. 1. This applies increments of anticlockwise moment to the part of the specimen held in clamp 1. This anticlockwise moment is applied to the weighing system 9. The wheel is turned until the beam 10 is again restored to the null position as indicated by detector 23, thus counterbalancing the increment of load. For each increment of load, the angular increment of bending is read off from the gage 31. Thus correlated parameters of bending angle in degrees versus applied moment in pounds-inches may be obtained throughout a full cycle of loading from zero to maximum and back to zero. By taking incremental readings, complete information can be obtained for making calculations according to the Formulae 1–5 above set forth, and for making appropriate charts exhibiting the results. These may be made to display plastic strain, yield strength, plastic after-effects and, in the case of full-cycle loading, to permit the detection of hysteresis, permanent set and the like.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of flexural testing of bendable specimens, comprising mounting one portion of a specimen in a first clamp, mounting a second portion of a specimen in a second clamp, rotating the second clamp to bend the specimen in one direction and to apply a first moment to the first clamp in the same direction as the direction of rotation of the second clamp, applying a second moment to the first clamp in a direction opposite to the direction of rotation of the second clamp and of a value to offset the first moment applied to the first clamp, and measuring the last-named moment and said rotation.

2. The method for flexural testing of bendable specimens, comprising locking a first suspended clamp in a fixed position, mounting one portion of a specimen in a first clamp, mounting a second portion of a specimen in a second clamp while the first clamp is locked, unlocking the first clamp, rotating the second clamp to bend the specimen in one direction and to apply a first moment to the suspended first clamp in the same direction as the direction of rotation of the second clamp, applying a second moment to the first clamp in a direction opposite to the direction of rotation of the second clamp and of a value to offset the first moment applied to the first clamp, and measuring the last-named moment and said rotation.

3. A flexure tester comprising a framework, substantially coplanar weighing and loading clamps spaced to hold therebetween a length of a test specimen, a rotatable weighing assembly carrying the weighing clamp and a weighing arm, first flexible suspension members for said assembly, said suspension members being located in one vertical plane, adjustable weight-supporting means on said arm movable from one location on the arm in which the arm has a null position when the loading clamp is in an initial position, a rotatable member supporting the loading clamp opposite to the weighing clamp, second flexible suspension members oppositely wrapped around coaxial circular parts of said rotatable member and adapted to rotatably control one end of said specimen relative to the other end thereof so as to turn said one end while translating it out of the plane of and toward said other end, said second flexible suspension members lying in a second vertical plane, a motion indicator, drive means between said rotatable member and said indicator for moving the latter in response to angular deflections of the rotatable member, the distance between the center line of said circular parts and the outermost surfaces of said second flexible suspension members where they are wrapped being substantially equal to the distance from said surfaces to the central plane of the first flexible suspension members.

4. A flexure tester according to claim 3, wherein all of the suspension members are in the form of tape.

5. A flexure tester according to claim 4, including releasable means adapted to lock said weighing assembly to the framework.

6. A flexure tester comprising a rotatable loading clamp for holding a specimen at one end and positioning it in an initially substantially horizontal position, a weighing assembly including a weighing clamp for clamping to the other end of said specimen when in said horizontal position, said assembly including a substantially horizontal beam, a movable weight on the beam, means for suspending said weighing assembly in a substantially horizontal null position of said beam when said weight is in a null position thereon, means for rotating the loading clamp, index means for measuring the rotation of the loading clamp, and indicating means associated with said beam for measuring the location of said weight relative to its null position when moved a sufficient amount on the beam to maintain the beam and the end portion of the specimen in the weighing clamp in the horizontal position under a condition wherein the loading clamp is rotated.

References Cited by the Examiner

UNITED STATES PATENTS

| | | | |
|---|---|---|---|
| 993,700 | 5/11 | McKnight | 73—103 X |
| 1,559,466 | 10/25 | Schopper | 73—100 |
| 2,448,133 | 8/48 | Yorgiadis | 73—100 |
| 3,026,720 | 3/62 | Hill et al. | 73—100 |

RICHARD C. QUEISSER, Primary Examiner.

JOSEPH P. STRIZAK, Examiner.